United States Patent [19]

Prentice

[11] Patent Number: 4,838,515
[45] Date of Patent: Jun. 13, 1989

[54] ARTICLE POSITIONER AND METHOD

[75] Inventor: Thomas C. Prentice, Westford, Mass.

[73] Assignee: Teledyne, Inc., Woburn, Mass.

[21] Appl. No.: 51,668

[22] Filed: May 18, 1987

[51] Int. Cl.$^4$ ............................................. F16M 11/12
[52] U.S. Cl. ................................... 248/661; 248/419;
248/1 R; 74/479; 74/110; 33/1 M
[58] Field of Search .............. 248/646, 660, 661, 669,
248/416, 419, 420, 178, 179, 183, 188.2, 913,
276; 403/160; 108/138; 74/479, 110; 33/567,
162, 1 M, 568, 573; 269/217, 234; 254/104

[56] References Cited

U.S. PATENT DOCUMENTS

| | | | |
|---|---|---|---|
| 1,006,974 | 10/1911 | Moore | 254/104 |
| 1,092,867 | 4/1914 | Sellew | 33/568 X |
| 1,218,771 | 3/1917 | Hoeschen | 74/110 |
| 2,248,715 | 7/1941 | Mafera | 254/104 |
| 2,819,037 | 1/1958 | Wilkin | 248/188.2 X |
| 3,247,598 | 4/1966 | Wilkes | 33/162 |
| 3,266,329 | 8/1966 | Sellers | 74/110 |
| 3,306,562 | 2/1967 | Bellefleur | 248/178 |
| 4,013,280 | 3/1977 | Chitayat | 33/568 X |
| 4,114,845 | 9/1978 | Weisenbergen | 248/188.2 X |
| 4,168,574 | 9/1979 | Chase | 33/162 |
| 4,213,509 | 7/1980 | Hafner | 74/110 X |
| 4,436,268 | 3/1984 | Schriever | 248/188.2 X |

FOREIGN PATENT DOCUMENTS

| | | | |
|---|---|---|---|
| 3012986 | 10/1981 | Fed. Rep. of Germany | 248/660 |
| 1398214 | 3/1965 | France | 248/646 |

Primary Examiner—J. Franklin Foss
Assistant Examiner—Robert A. Olson
Attorney, Agent, or Firm—Richard J. Birch

[57] ABSTRACT

An X, Y, Z (and $\theta$) article positioner and method are disclosed in which two axial elements, one inclined at an angle $\alpha$ and the other inclined at an angle $-\alpha$, are utilized in conjunction with each other to accomplish moves in a pure X or pure Z direction or a combination thereof. Each axial element is driven by a lead screw, which in turn is driven by a motor. Pure X movement is achieved by driving the lead screws the same amount, at the same rate, in the same direction. Conversely, to achieve a pure Z movement, the two lead screws are driven the same amount, at the same rate, but in opposite directions. In the preferred embodiment, three superposed and independently driven wedges are used to provide the desired single axis or combinational axis movement to position a workpiece in X, Y and Z with rotational movement of the three wedges providing $\theta$ axis positioning.

14 Claims, 4 Drawing Sheets $X = A \cos \alpha + B \cos \beta$ $Z = A \sin \alpha - B \sin \beta$ $A = \dfrac{X \sin \beta}{\sin(\alpha+\beta)} + \dfrac{Z \cos \beta}{\sin(\alpha+\beta)}$ $B = \dfrac{X \sin \alpha}{\sin(\alpha+\beta)} + \dfrac{Z \cos \alpha}{\sin(\alpha+\beta)}$

ARTICLE POSITIONER AND METHOD

BACKGROUND OF THE INVENTION

The present invention relates to article positioners in general and, more particularly, to an X, Y, Z and θ article positioner that utilizes a plurality of sliding wedges to mutually independent movement in one or more orthogonally related directions.

The use of wedges to position an article is known in the art. See: U.S. Pat. No. 1,218,771, "Mechanical Movement", issued Mar. 13, 1917; U.S. Pat. No. 3,266,329, "Mechanical Movement", issued Aug. 16, 1966; and, U.S. Pat. No. 4,213,509, "Hydrostatic Setting Apparatus For Support Of Loads", issued July 22, 1980.

Article positioners per se are used in a variety of industries. For example, in the semiconductor industry X, Y, Z and θ "tables" are employed to position a semiconductor wafer with respect to the testing head of a wafer prober. The semiconductor wafer is positioned in X, Y and θ and then moved in the Z axis to contact the wafer prober. After testing, the wafer is moved in the opposite direction along the Z axis and then positionally adjusted with respect to a new test point in X, Y and θ orientation. In this example, the Z axis movement is significantly less than movement in the X and Y axes. Not only is the Z axis movement smaller, but the positional resolution constraint is significantly tighter. Furthermore, it is important to have the table relatively stiff in the Z axis as opposed to the X and Y axes.

It is accordingly a general object of the present invention to provide an improved X, Y, Z and θ article positioner.

It is a specific object of the invention to provide an article positioner that employs a plurality of sliding wedges to achieve mutually independent movement in at least two orthogonally related axes.

It is a further object of the invention to provide an article positioner that is relatively stiff in one axis as compared to the stiffness in the other axes of movement.

It is a feature of the invention that the article positioner provides greater travel in the X direction as compared to a conventional article positioner having a similar "footprint".

It is another feature of the invention that the article positioner provides greater X speed and greater X acceleration when compared to traditional article positioners.

It is still a further feature of the invention that stiffness in the Z direction is significantly increased together with increased resolution in the Z direction.

BRIEF DESCRIPTION OF THE INVENTION

The article positioner and method utilize three independently driven wedges that are slidably mounted in superposed relation with respect to each other. The relative movement of the wedges provides a single axis or combinational axes movement to position a workpiece in X, Y and Z with rotational movement of the three wedges as an entity providing θ axis positioning.

BRIEF DESCRIPTION OF THE DRAWINGS

The objects and features of the invention described above will best be understood from a detailed description of a preferred embodiment, selected for purposes of illustration, and shown in the accompanying drawings in which.

DETAILED DESCRIPTION OF THE INVENTION

Figure 1:
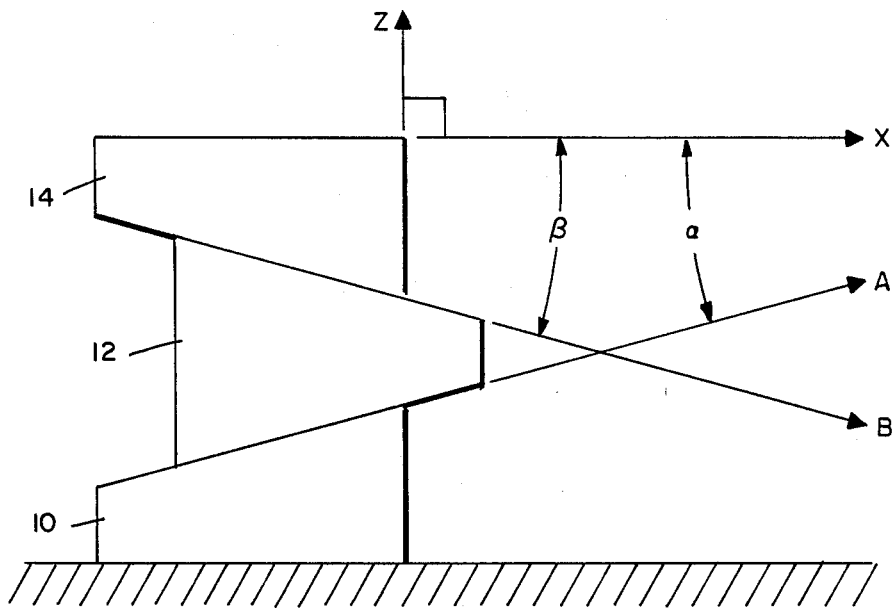
FIG. 1 is a diagrammatic view showing three slidable wedges and the geometric relationships required to produce movement in the X and Z directions.

Turning now to the drawings, and particularly to FIG. 1, there is shown in diagrammatic form the general case for the X and Z axis movement of three wedges 10, 12 and 14. The three wedges are shown in superposed relation and will be referred to hereinafter as the lower wedge 10, middle wedge 12 and upper wedge 14. The use of the terms "lower", "middle" and "upper" are used only for convenience in describing the relationships of the three wedges and it should be understood that the three wedges can be orientated in any direction with respect to a gravity vector.

Figure 2A:
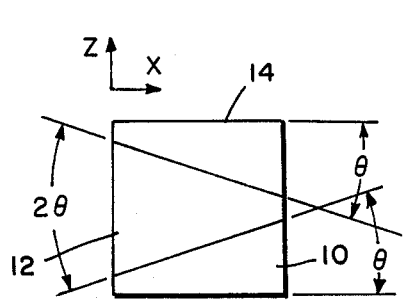
FIGS. 2A through 2C are similar diagrammatic views showing the three wedges in a neutral position in FIG. 2A, the movement of the upper and middle wedges to produce a pure X movement in FIG. 2B and movement of the upper and middle wedges to produce a pure Z movement in FIG. 2C.
Figure 2B:
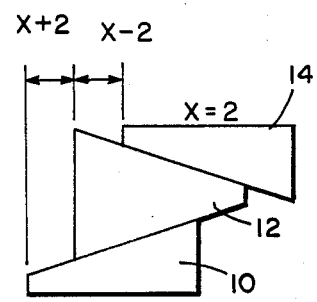
Figure 2C:
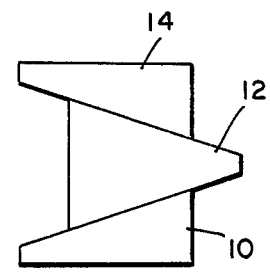

FIGS. 2A through 2C illustrate in diagrammatic form the movements obtained by moving the middle and upper wedges 12 and 14, respectively. The neutral positions for the wedges is depicted in FIG. 2A. FIG. 2B illustrates the movements required to achieve a "pure" movement in the X direction. The wedge configuration in FIG. 2B utilizes two degrees of freedom to obtain X and Z motion. The motion of the middle wedge 12 with respect to the bottom wedge 10 can be considered (X+Z). Similarly, the motion of the upper stage 14 with respect to the middle stage 12 (in the same direction) can be considered as (X−Z). Thus, to obtain pure X· movement, equal distance moves are made along both axes in the same direction. In other words, (X+Z)+(X−Z)=2X. Similarly, to obtain a "pure" Z movement as illustrated in FIG. 2C, the middle and upper wedges 12 and 14, respectively, are moved by the same amount, i.e., distance, but in opposite directions. Thus, (X+Z)−(X−Z)=2Z.

Referring now to FIGS. 3 through 7, there is shown an article positioner constructed in accordance with the present invention and indicated generally by the reference numeral 16. In this embodiment, two axes are utilized, one inclined at 13° and one inclined at −13°. Using the "general case" formula set forth in FIG. 1, $\alpha = \beta = 13°$ and, therefore:

$$X = A \cos\alpha + B \cos\alpha$$
$$Z = A \sin\alpha - B \sin\alpha$$
$$A = \frac{X \sin\alpha}{\sin(2\alpha)} + \frac{Z \cos\alpha}{\sin(2\alpha)}$$
$$B = \frac{X \sin\alpha}{\sin(2\alpha)} - \frac{Z \cos\alpha}{\sin(2\alpha)}$$

-continued

Since, sin $(2\alpha) = 2 \sin\alpha \cos\alpha$
Then;

$$A = \frac{X}{2\cos\alpha} + \frac{Z}{2\sin\alpha}$$

$$B = \frac{X}{2\cos\alpha} - \frac{Z}{2\sin\alpha}$$

Figure 3:
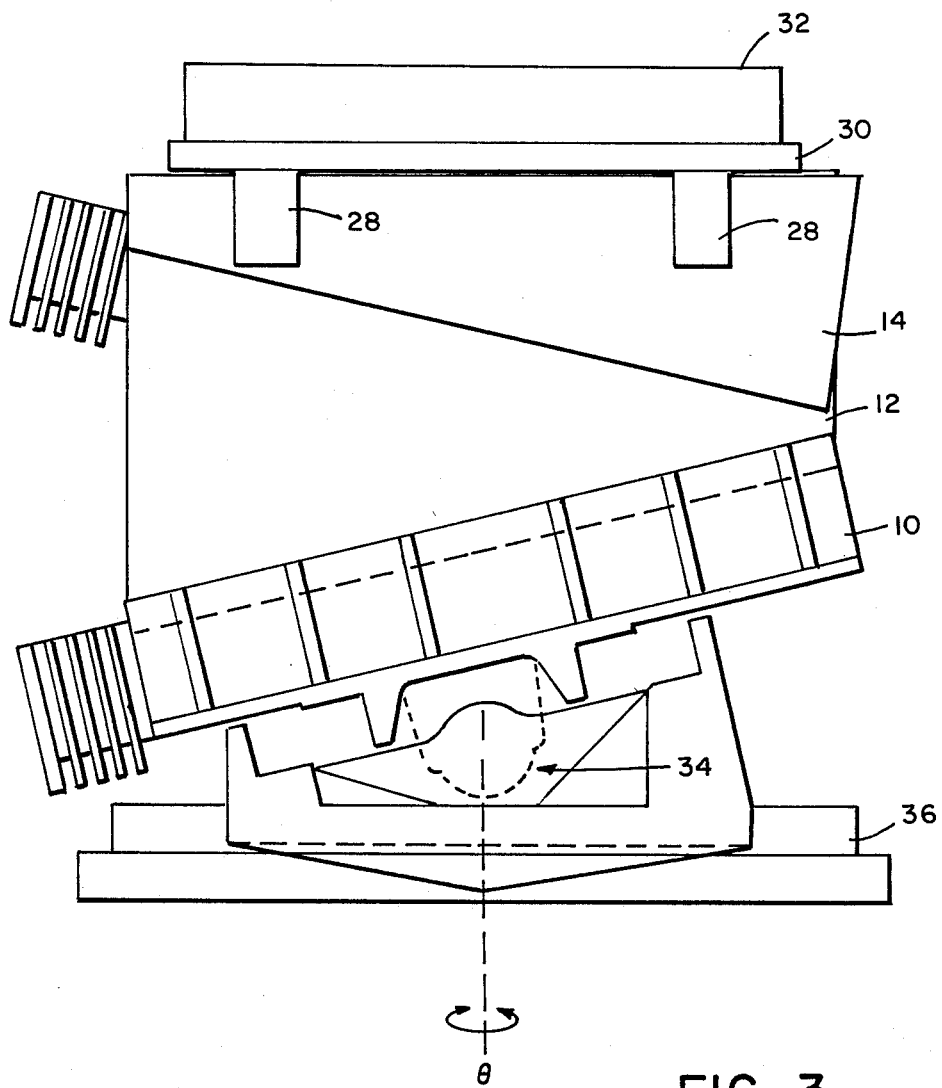
FIG. 3 is a simplified view in front elevation showing the ball mounting of the lowermost wedge.
Figure 4:
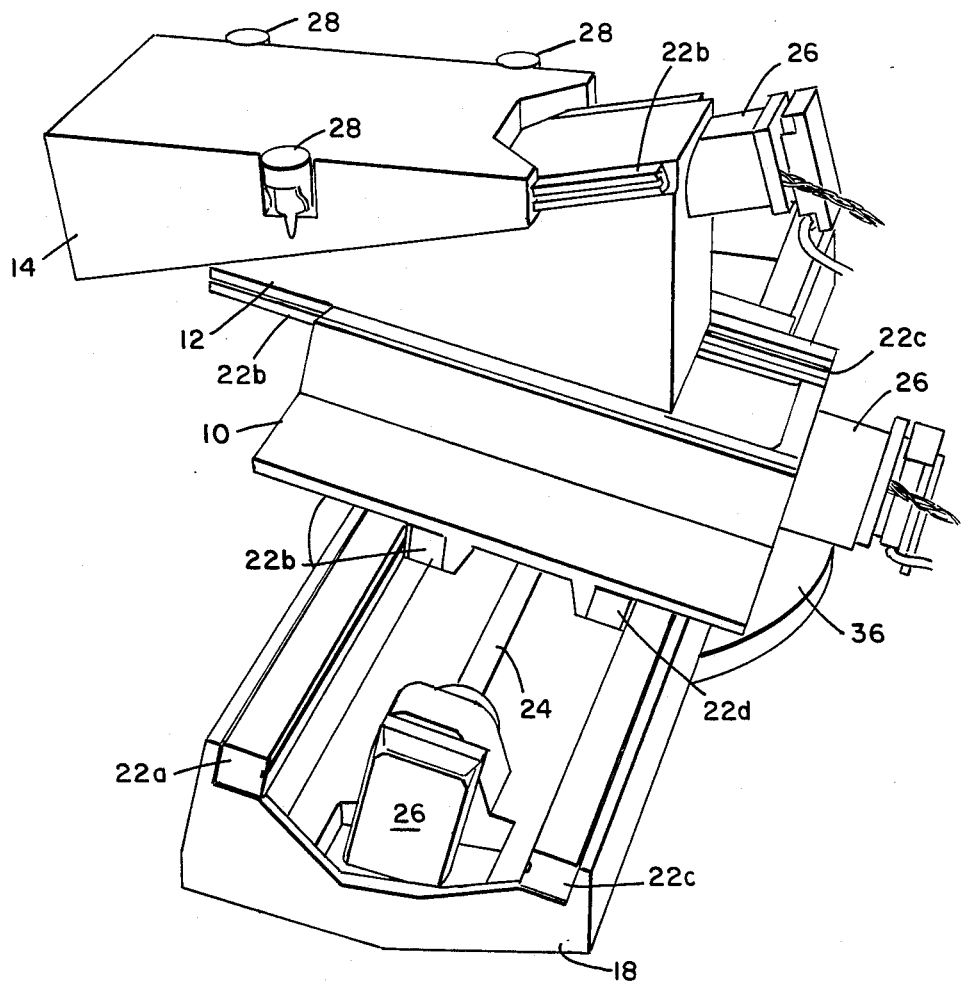
FIG. 4 is a rear perspective view of the article positioner of the present invention showing the wedges positioned for a pure $-X$ movement.

Looking at FIGS. 3 and 4, the article positioner 16 is shown in front view in FIG. 3 and in a perspective, rear view in FIG. 4. The lower wedge 10 is mounted for sliding movement with respect to a Y axis base plate 18 by means of a linear bearing indicated generally by the reference numeral 20. The linear bearing 20 comprises four linear bearing tracks 22a, 22b, 22c and 22d. A variety of commercially available antifriction guideways can be used for the linear bearing 20. For example, the linear bearings manufactured by Schneeberger are suitable for use in the article positioner 16.

Sliding movement of the lower wedge 10 along the longitudinal, i.e. the Y axis, of the Y axis baseplate 18 is accomplished by means of a lead screw 24 that is driven by a stepper motor 26 mounted on the Y axis baseplate 18. The same linear bearing, lead screw and stepper motor arrangement is used to mount and drive the middle wedge 12 with respect to the lower wedge 10 and the upper wedge 14 with respect to the middle wedge 12. For simplicity, the same reference numerals have been used to indicate the same components with respect to both the middle and upper wedges.

The upper wedge 14 has a three point plate stage mounting system comprising adjustable mounts 28 that support a workpiece support plate 30 upon which is located a workpiece 32. The adjustable mounts 28 permit leveling of the workpiece support plate 30 with respect to a reference plane (not shown).

The entire assembly of the wedges, motors and workpiece support plate is mounted for $\theta$ axis rotation by means of a $\theta$ axis ball mount indicated generally by the reference numeral 34. The ball mount permits rotation about the $\theta$ axis which is normal to $\theta$ axis baseplate 36. Rotation of the article positioner about the $\theta$ axis is provided by a motor drive (not shown).

Figure 5:
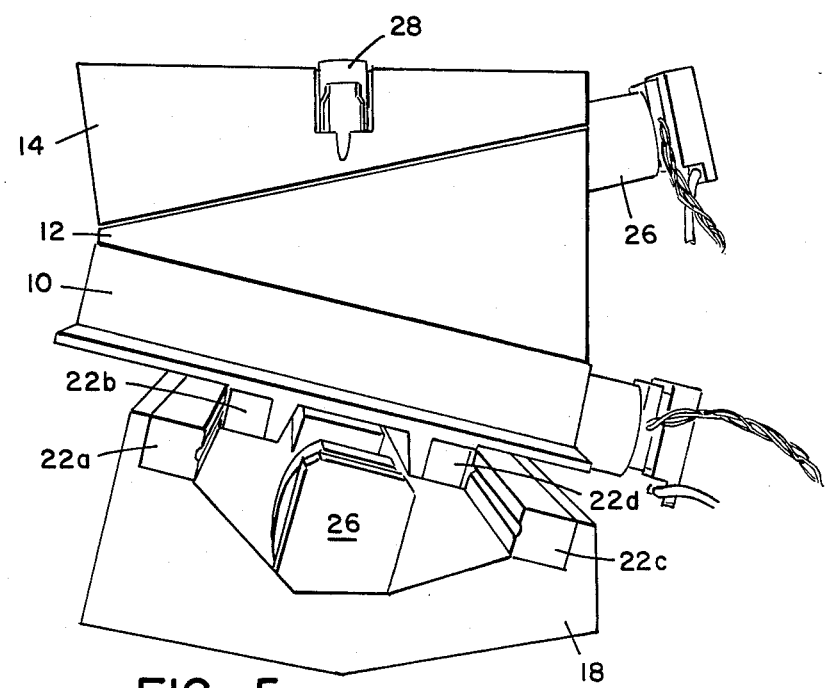
FIG. 5 is a view in side elevation showing the article positioner of the present invention with the three wedges in a "neutral" position.
Figure 7:
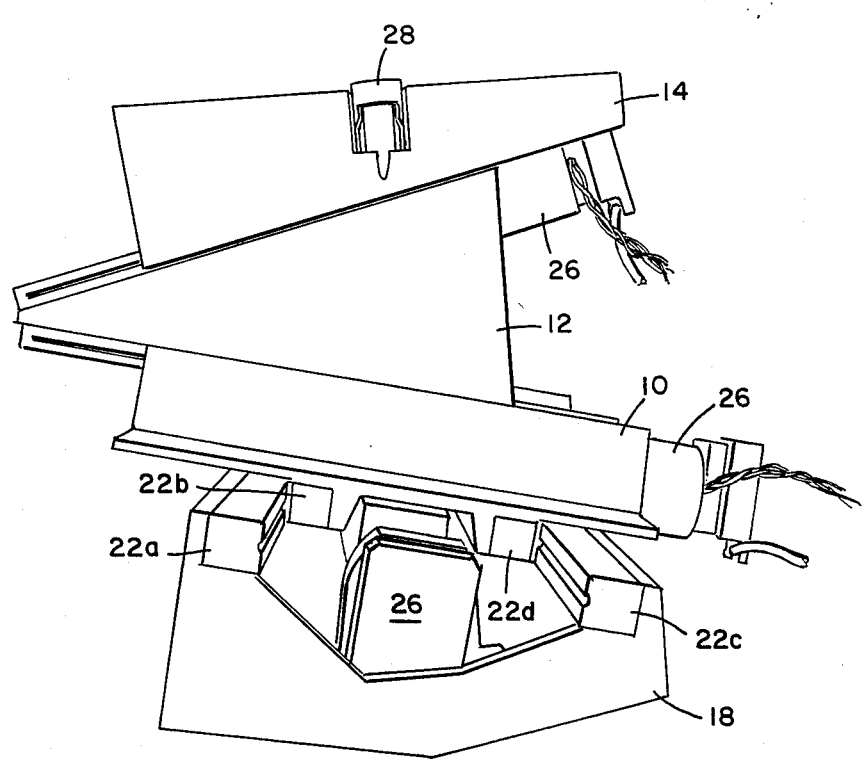
Figure 6:
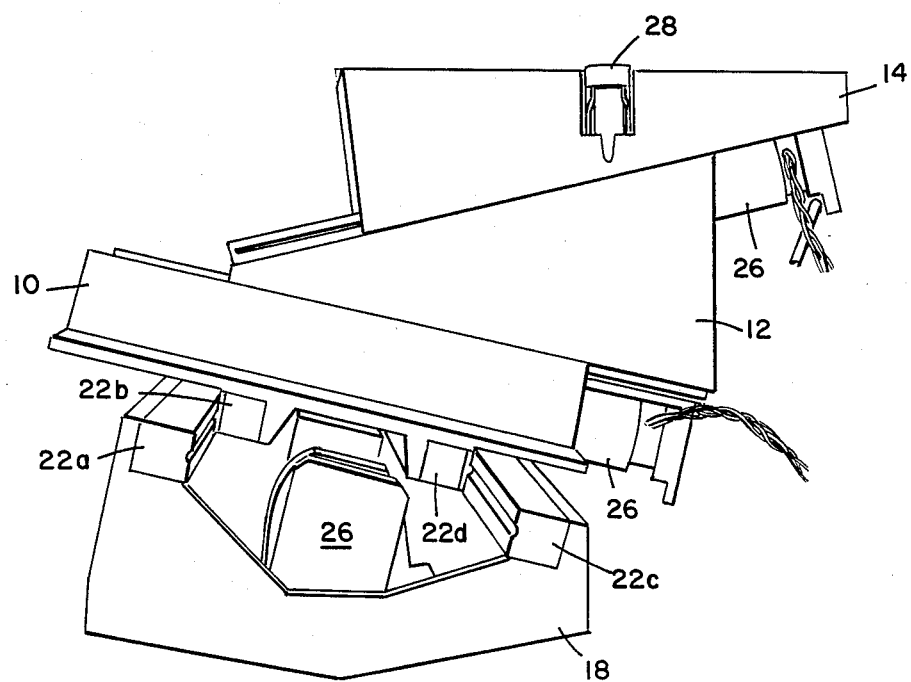
FIG. 6 is a view in side elevation showing the position of the wedges for a pure $+X$ movement; and, FIG. 7 is another view in side elevation showing the position of the wedges to produce a pure $+Z$.

Looking now at FIGS. 5, 6 and 7, FIG. 5 shows the position of the lower, middle and upper wedges in the "neutral" position. Movement of both the middle and upper wedges 12 and 14, respectively, at the same rate and in the same direction and by the same amount accomplishes a "pure" movement along the X axis. FIG. 6 depicts "pure" X movement in the +X direction, while FIG. 4 shows the same "pure" X movement, but in the −X direction. If both the middle and upper wedges are moved at the same rate and by the same amount, but in opposite directions, as shown in FIG. 7, "pure" Z movement is obtained, in this case "pure" Z movement in the +Z direction.

Having described in detail a preferred embodiment of my invention, it will now be apparent to those skilled in the art that numerous modifications can be made therein without departing from the scope of the invention as defined in the following claims. For example, although reference has been made to movement in only the X and Z directions, comparable movement can be achieved in all three axes, i.e., X, Y and Z, using my sliding wedge concept.

What I claim and desire to secure by Letters Patent of the United States is:

1. An article positioner comprising:
first wedge means having a wedge axis and a wedging surface, said wedging surface intersecting the wedge axis at an acute angle;
second wedge means having a wedge axis, a left wedging surface and a right wedging surface, said weighing surfaces intersecting the second wedge means wedging axis at an acute angle and with said right wedging surface being positioned with respect to said first wedge means wedging surface for wedging movement relative thereto;
third wedge means having a wedge axis and a wedging surface, said wedging surface intersecting the third wedge means wedge axis at an acute angle and with said wedging surface being positioned with respect to said second wedge means left wedging surface for wedging movement relative thereto;
means for independently moving at least two of said wedge means with respect to each other along their respective wedge axes and with respect to the third of said wedge means.

2. An article positioner comprising:
first wedge means having a wedge axis and a wedging surface, said wedging surface intersecting the wedge axis at an acute angle;
second wedge means having a wedge axis, a left wedging surface and a right wedging surface, said wedging surfaces intersecting the second wedge means wedging axis at an acute angle and with said right wedging surface being positioned with respect to said first wedge means wedging surface for wedging movement relative thereto;
third wedge means having a wedge axis and a wedging surface, said wedging surface intersecting the third wedge means wedge axis at an acute angle and with said wedging surface being positioned with respect to said second wedge means left wedging surface for wedging movement relative thereto;
means for independently moving at least two of said wedge means with respect to each other along their respective wedge axes and with respect to the third of said wedge means;
means for moving said first, second and third wedge means as a single entity.

3. An article positioner comprising:
first wedge means having a wedge axis and a wedging surface, said wedging surface intersecting the wedge axis at an acute angle;
second wedge means having a wedge axis, a left wedging surface and a right wedging surface, said wedging surfaces intersecting the second wedge means wedging axis at an acute angle and with said right wedging surface being positioned with respect to said first wedge means wedging surface for wedging movement relative thereto;
third wedge means having a wedge axis and a wedging surface, said wedging surface intersecting the third wedge means wedge axis at an acute angle and with said wedging surface being positioned with respect to said second wedge means left wedging surface for wedging movement relative thereto;
means for independently moving at least two of said wedge means with respect to each other along their respective wedge axes and with respect to the third of said wedge means;

means for moving said first, second and third wedge means as a single entity in a direction normal to a plane containing the wedge axes of said first, second and third wedge means.

4. An article positioner comprising:

first wedge means having a wedge axis and a wedging surface, said wedging surface intersecting the wedge axis at an acute angle;

second wedge means having a wedge axis, a left wedging surface and a right wedging surface, said wedging surfaces intersecting the second wedge means wedging axis at an acute angle and with said right wedging surface being positioned with respect to said first wedge means wedging surface for wedging movement relative thereto;

third wedge means having a wedge axis and a wedging surface, said wedging surface intersecting the third wedge means wedge axis at an acute angle and with said wedging surface being positioned with respect to said second wedge means left wedging surface for wedging movement relative thereto;

means for independently moving at least two of said wedge means with respect to each other along their respective wedge axes and with respect to the third of said wedge means;

means for rotating said first, second and third wedge means as a single entity about a rotation axis that lies in a plane containing the wedge axes of said first, second and third wedge means.

5. A method for moving an article positioner that has:

first wedge means having a wedge axis and a wedging surface, said wedging surface intersecting the wedge axis at an acute angle;

second wedge means having a wedge axis, a left wedging surface and a right wedging surface, said wedging surfaces intersecting the second wedge means wedging axis at an acute angle and with said right wedging surface being positioned with respect to said first wedge means wedging surface for wedging movement relative thereto;

third wedge means having a wedge axis and a wedging surface, said wedging surface intersecting the third wedge means wedge axis at an acute angle and with said wedging surface being positioned with respect to said second wedge means left wedging surface for wedging movement relative thereto;

means for independently moving at least two of said wedge means with respect to each other along their respective wedge axes and with respect to the third of said wedge means, said method comprising the steps of moving said first and second wedge means along their respective wedge axes in the same direction and by the same distance.

6. A method for moving an article positioner that has:

first wedge means having a wedge axis and a wedging surface, said wedging surface intersecting the wedge axis at an acute angle;

second wedge means having a wedge axis, a left wedging surface and a right wedging surface, said wedging surfaces intersecting the second wedge means wedging axis at an acute angle and with said right wedging surface being positioned with respect to said first wedge means wedging surface for wedging movement relative thereto;

third wedge means having a wedge axis and a wedging surface, said wedging surface intersecting the third wedge means wedge axis at an acute angle and with said wedging surface being positioned with respect to said second wedge means left wedging surface for wedging movement relative thereto;

means for independently moving at least two of said wedge means with respect to each other along their respective wedge axes and with respect to the third of said wedge means, said method comprising the steps of moving said first and second wedge means along their respective wedge axes in the same direction and by unequal distances.

7. A method for moving an article positioner that has:

first wedge means having a wedge axis and a wedging surface, said wedging surface intersecting the wedge axis at an acute angle;

second wedge means having a wedge axis, a left wedging surface and a right wedging surface, said wedging surfaces intersecting the second wedge means wedging axis at an acute angle and with said right wedging surface being positioned with respect to said first wedge means wedging surface for wedging movement relative thereto;

third wedge means having a wedge axis and a wedging surface, said wedging surface intersecting the third wedge means wedge axis at an acute angle and with said wedging surface being positioned with respect to said second wedge means left wedging surface for wedging movement relative thereto;

means for independently moving at least two of said wedge means with respect to each other along their respective wedge axes and with respect to the third of said wedge means, said method comprising the steps of moving said first and second wedge means along their respective wedge axes in opposite directions.

8. An article positioner comprising:

(1) first, second and third rigid body means, said body means being assembled together to define a first axis between the first and second rigid body means and a second axis between the second and third rigid body means with said first and second axes being non-parallel;

(2) first means for moving the second rigid body means along the first axis relative to the first rigid body means; and, (3) second means for moving the third rigid body means along the second axis relative to both of said first and second rigid body means, said first and second moving means producing a coordinated movement of the third rigid body means relative to the first rigid body means with said coordinated movement being parallel to neither the first axis nor the second axis.

9. An article positioner comprising:

(1) first, second and third rigid body means, said body means being assembled together to define a first axis A between the first and second rigid body means and a second axis B between the second and third rigid body means with said A and B axes being non-parallel and defining angles $\alpha$ and $\beta$, respectively, relative to a reference orthogonal coordinate system X, Z;

(2) first means for moving the second rigid body means along the A axis relative to the first rigid body means; and, (3) second means for moving the third rigid body means along the B axis relative to both of said first and second rigid body means, said first and second moving means producing a coordinated movement of the third rigid body means relative to the first rigid body means with said coordinated movement being characterized by $X = A \cos \alpha + B \cos \beta$ and $Z = A \sin \alpha - B \sin \beta$.

10. The article positioner of claim 9 wherein the angles $\alpha$ and $\beta$ are equal.

11. The article positioner of claim 10 wherein the coordinated movement is parallel to the X coordinate.

12. The article positioner of claim 10 wherein the coordinated movement is parallel to the Z coordinate.

13. The article positioner of claim 9 wherein the coordinated movement is parallel to neither the X nor Z coordinates.

14. An article positioner comprising:
(1) first, second and third rigid body means, said body means being assembled together to define a first axis A between the first and second rigid body means and a second axis B between the second and third rigid body means with said A and B axes being non-parallel and defining angles $\alpha$ and $\beta$, respectively, relative to a reference orthogonal coordinate system X, Y and Z;
(2) first means for moving the second rigid body means along the A axis relative to the first rigid body means;
(3) second means for moving the third rigid body means along the B axis relative to both of said first and second rigid body means, said first and second moving means producing a coordinated movement of the third rigid body means relative to the first rigid body means with said coordinated movement being characterized by $X = A \cos \alpha + B \cos \beta$ and $Z = A \sin \alpha - B \sin \beta$; and,
(4) third means for moving said first, second and third rigid body means as an entity in the Y coordinate.

* * * * *